United States Patent [19]

Bruttel et al.

[11] 4,390,342

[45] Jun. 28, 1983

[54] PROCESS FOR THE PREPARATION OF SOLID COMPOSITION OF WATER-SOLUBLE DYES

[75] Inventors: Beat Bruttel, Böckten; Heinz Pfenninger, Lupsingen, both of Switzerland

[73] Assignee: Ciba-Geigy Corporation, Ardsley, N.Y.

[21] Appl. No.: 247,696

[22] Filed: Mar. 26, 1981

[30] Foreign Application Priority Data

Apr. 1, 1980 [CH] Switzerland .................. 2565/80

[51] Int. Cl.³ ............... C09B 67/04; C09B 67/54; C09B 67/06
[52] U.S. Cl. .................................... 8/524; 8/527
[58] Field of Search ............................ 8/524, 527

[56] References Cited

U.S. PATENT DOCUMENTS 4,295,851 10/1981 Neumann et al. .............. 8/527

FOREIGN PATENT DOCUMENTS 1359898 7/1974 United Kingdom ............ 8/524

*Primary Examiner*—Maria Parrish Tungol
*Attorney, Agent, or Firm*—Joseph G. Kolodny

[57] ABSTRACT

A process for producing solid dye compositions, which process comprises passing an aqueous solution or suspension of at least one water-soluble crude dye, to effect separation of synthesis by-products having a molecular weight of below 500 and partial separation of water, through a semipermeable membrane, subsequently drying the resulting aqueous preparation which has become more highly concentrated, and optionally adding further additives before and/or after passage of the aqueous solution or suspension through the semipermeable membrane, these additives being added beforehand only when they do not become separated by the membrane.

There are obtained by this process low-dust to dust-free compositions which are distinguished by high mechanical strength, high bulk density, free-flowing characteristics and good dissolving behavior. Employing these compositions it is possible to prepare low-foam to foam-free aqueous dye liquors having very good solution stability, even in the presence of electrolytes.

37 Claims, No Drawings

PROCESS FOR THE PREPARATION OF SOLID COMPOSITION OF WATER-SOLUBLE DYES

The invention relates to a process for the preparation of solid compositions of water-soluble dyes, and also to the compositions, as industrial products, obtained by the process.

Virtually all dyes in the pulverulent state have the unpleasant property of tending to release dust. Furthermore, the wettability with water in the case of many pulverulent water-soluble dyes is so poor that the rate of dissolving in water is very low. It has been attempted on the one hand to avoid these difficulties by using liquid formulations; but these liquid preparations have other disadvantages, for example reduced stability on variation of temperature, crystallising out and settling of the dyes during storage. Attempts have been made on the other hand to produce the dyes in granulated form. In the granulated form too, however, not all properties are satisfactory, for example mechanical stability, such as abrasion resistance, solubility, particularly in cold water, and bulk density.

The object of the present invention has been to provide a commercial form of water-soluble dyes which overcomes the disadvantages of the known granulated and liquid commercial forms. This object has been realised by the development of a process in which the water-soluble dyes are firstly freed by means of reverse osmosis from impurities originating from their synthesis, and then subjected to a dyring process, preferably to a granulating process.

The process according to the invention thus comprises passing an aqueous solution or suspension of at least one water-soluble crude dye, to effect separation of synthesis by-products having molecular weights of below 500 and partial separation of water, through a semipermeable membrane, subsequently drying the resulting aqueous preparation which has become more concentrated, and optionally adding further additives before and/or after passage of the aqueous solution or suspension through the semipermeable membrane, these additives being added beforehand only when they do not become separated by the membrane. Drying is preferably carried out in a spray dryer or in a fluidised bed dryer.

Preferred additives usable according to the invention are surface-active substances (tensides), which can be introduced either singly or in admixture with each other. They are generally used in amounts of 1 to 30 percent by weight, relative to the dye composition. A mixture of anionic and nonionic tensides, for example 1 to 20% of an anionic tenside and 1 to 15% of a nonionic tenside, has proved to be advantageous.

In addition to using these surface-active substances, it is also possible to use further additives in overall amounts of 1 to 45 percent by weight, relative to the dye composition, such as especially binding agents, antidust agents, solubility-promoting agents and diluting agents such as inorganic or organic salts.

The present invention relates also to the dye compositions obtained by the process according to the invention.

Surface-active substances usable according to the invention are for example: wetting or dispersing agents of anionic, cationic or nonionic nature, such as ligninsulfonate, dinaphthylmethanedisulfonic acid, sodiumdioctyl-sulfosuccinate, dibutylnaphthalenesulfonate, dodecylbenzenesulfonate, laurylpyridinium chloride, alkylphenol polyglycol ether, stearyl-diphenyl-hydroxyethyldiethylenetriamine and ethylene oxide adducts.

Anionic surface-active substances (tensides) are preferred, such as condensation products of aromatic sulfonic acids with formaldehyde, for example condensation products of formaldehyde, naphthalenesulfonic acid and benzenesulfonic acid, or of crude cresol, formaldehyde and naphthalenesulfonic acid, and in particular condensation products of phenol-, cresol- or naphthol-sulfonic acid and formaldehyde, and especially condensation products of naphthalenesulfonic acid and formaldehyde, such as the sodium salt of the condensation product of naphthalenesulfonic acid with formaldehyde of the formula

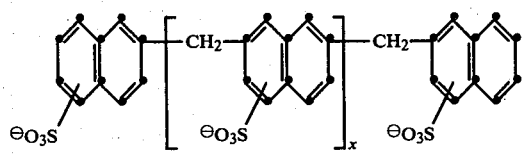

x=0 to 7, or ligninsulfonates (sulfite-cellulose waste liquor) and hydroxyligninsulfonates; also polymerisation products of unsaturated acids, such as the polymerisation product of acrylic acid or methacrylic acid of the formula

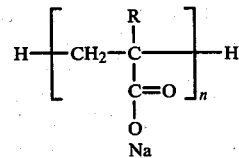

R=H or CH$_3$; n=about 10 to 100.

Suitable nonionic tensides are in particular: polyethylene glycols having a molecular weight preferably of 200 to 1000; copolymers of ethylene oxide and propylene oxide (so-called block polymers); symmetrical acetylenes, for example the tertiary acetylene glycol compound of the formula

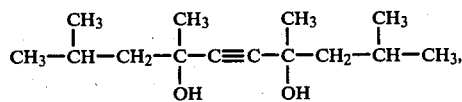

reaction products of fatty acids having 8 to 22 carbon atoms and amines or hydroxyalkylamines, for example coconut fatty acid amide, oleic acid diethanolamide or coconut fatty acid ethanolamide.

Products which have proved particularly advantageous are addition products of for example 5 to 200 mols, preferably 20 to 100 mols, of alkylene oxides, especially of ethylene oxide, it being possible for individual ethylene oxide units to be replaced by substituted epoxides, such as styrene oxide and/or propylene oxide, added by an addition reaction to higher fatty acids, preferably having 8 to 22 carbon atoms, for example addition products of fatty acids (for example oleic acid or ricinoleic acid) and 10 to 30 mols of ethylene oxide, preferably an addition product of oleic acid and 20 mols of ethylene oxide, or a ricinoleic acid ester having 15 mols of ethylene oxide, or addition products of alkylene oxides with saturated or unsaturated alcohols, mercaptans or amines having 8 to 20 carbon atoms, or with alkylphenols or alkylthiophenols, of which the alkyl groups have at least 7 carbon atoms, for example fatty alcohol polyglycol ethers, particularly those formed from an aliphatic hydrocarbon radical containing 8 to 22 carbon atoms, etherified with 5 to 200 mols, preferably with 20 to 100 mols, of ethylene oxide, such as cetyl alcohol etherified with 25 mols of ethylene oxide, stearyl alcohol etherified with 25 to 80 mols of ethylene oxide, and oleyl alcohol etherified with 20 to 80 mols of ethylene oxide; and also hydroabietyl alcohol etherified with 25 to 100 mols of ethylene oxide, or p-nonylphenol etherified with 9 mols of ethylene oxide.

The aliphatic hydrocarbon radicals of fatty alcohol polyglycol ethers are derived from higher alcohols having 8 to 22 carbon atoms, for example decyl, lauryl, tridecyl, myristyl, cetyl, stearyl, oleyl, arachidyl or behenyl alcohol.

Suitable higher fatty acids having 8 to 22 carbon atoms are for example: caprylic, capric, lauric, myristic, palmitic, stearic, arachic, behenic, coconut oil-($C_8$–$C_{18}$), decenic, dodecenic, tetradecenic, hexadecenic, oleic, linoleic, linolenic, ricinoleic, eikosenic, dokosenic or clupanodonic acid.

Examples of suitable binding agents usable according to the invention, which can be used as further additives, are: saccharose, alginates, gelatine, glycerin, glycols, carboxymethylcellulose, polyvinylpyrrolidones, polyvinyl alcohols, as well as starch and starch degradation products which contain at least five hydroxyl groups per molecule, such as sorbitol, hydrate dextrose, glucose, lactose, mannitol, mannose or preferably dextrin. They are used preferably in amounts of 1 to 40 percent by weight, relative to the dye composition.

The anti-dust agents used are the conventional agents, such as homogeneous mixtures of mineral oils and emulsifiers having an unlimited emulsifying capacity with water, for example paraffin oil and mineral oils, optionally emulsified with suitable emulsifiers, for example fatty acid (fatty alcohol)/ethylene oxide adducts, especially a mixture of mineral oil or mineral oil sulfonic acid and an emulsifier, or of paraffin oil and a nonionic emulsifier. The amount of anti-dust agent preferably used is 1 to 10 percent by weight, relative to the dye composition.

To be mentioned as solubility promoting agents usable according to the invention are urea, tetramethylurea and caprolactam, as well as auxiliaries having an intensified hydrotropic action, such as the mixtures of auxiliaries described in the German Offenlegungsschrift No. 2,802,327. The agent promoting solubility is preferably used in amounts of 1 to 30 percent by weight, relative to the dye composition.

Examples of inorganic salts are: sodium chloride, lithium chloride, sodium carbonate, sodium hydrogen carbonate, mono-, di- or tri-sodium phosphate, disodium hydrogen phosphate, sodium tripolyphosphate, polyphosphates, sodium nitrate, sodium sulfate, ammonium sulfate, potassium sulfate, lithium sulfate, sodium hydrogen sulfate, and an example of an organic salt is sodium acetate. Preferred amounts are 1 to 40 percent by weight, relative to the composition.

Suitable water-soluble dyes are for example: acid and basic dyes, such as metal-complex dyes, chrome dyes, developing dyes and mordant dyes, and especially reactive dyes. They are in particular sulfo group- or carboxylic group-containing metal-free or metal-containing and metallisable mono-, dis- and polyazo dyes, pyrazolone, thioxanthone, oxazine, stilbene and formazan dyes, anthraquinone, nitro, methine, triphenylmethane, xanthone, naphthazarine, styryl, azastyryl, naphthoperinone, quinophthalone and phthalocyanine dyes, as well as preferably dyes of this type which contain at least one fibre-reactive group in the dye molecule.

The water-soluble anionic dyes preferably used according to the invention are in particular the alkali salts or ammonium salts of the so-called acid wool dyes, of reactive dyes or of substantive cotton dyes of the azo, anthraquinone and phthalocyanine series. Suitable azo dyes are for example: metal-containing or metal-free mono- and disazo dyes as well as formazan dyes, which contain one or more sulfonic acid groups; anthraquinone dyes are especially 1-amino-4-arylaminoanthraquinone-2-sulfonic acids, and phthalocyanine dyes are in particular sulfonated copper phthalocyanines or phthalocyaninearylamides.

Water-soluble metal-complex dyes preferably used are sulfo group- or carboxylic group-containing metal-complex dyes, for example 1:1- or 1:2-metal complexes of azo or azomethine dyes, or metallised phthalocyanines, especially copper and nickel phthalocyanines. The 1:1- and 1:2-metal complexes are preferably 1:1-nickel complexes, 1:1-cobalt complexes, 1:1-copper complexes, 1:1-chromium complexes or 1:1-iron complexes, or symmetrical or asymmetrical 1:2-cobalt complexes, 1:2-iron complexes or 1:2-chromium complexes of in particular o-carboxy-o'-hydroxy-, o-hydroxy-o'-amino- or o,o'-dihydroxyazo dyes of the benzene-azobenzene-, naphthalene-azo-naphthalene-, benzene-azo-naphthalene, benzene-azo-pyrazolone, benzene-azo-pyridone or benzene-azo-acetic acid amide type, wherein these groupings can be unsubstituted or substituted. Suitable substituents are for example: unsubstituted or substituted sulfonic acid amides or sulfones, halogen or nitro.

The copper and nickel phthalocyanines used according to the invention are derived from the customary mixtures of different sulfonation grades, and preferably contain 2 to 3 or also 4 sulfated sulfonic acid-$\beta$- or -$\gamma$-hydroxyalkylamide groups; they can in addition however also contain individual halogens and individual sulfonic acid amide groups, these sulfonic acid amide groups being unsubstituted or substituted on the nitrogen atom, for example by lower alkyl, such as methyl, ethyl, propyl or butyl, or by lower hydroxyalkyl groups, such as 2-hydroxyethyl, 2-hydroxypropyl or 3-hydroxypropyl.

In the present process, the azo dyes containing sulfonic acid groups are advantageously used in the form of their metal salts, for example potassium or in particular sodium salts.

The reactive dyes contain as suitable fibre-reactive groups for example heterocyclic groups or an acyl group of a carboxylic acid, these groups having at least one halogen atom which can be split off under dyeing conditions. They are for example the following groups: s-triazinyl groups which carry on the triazine ring one or two halogen atoms, such as chlorine, fluorine or bromine atoms; pyrimidyl groups which carry on the pyrimidine ring one to three halogen atoms, such as chlorine and/or fluorine atoms, or one or two arylsulfonyl or alkanesulfonyl groups; dichloroquinoxylinyl, 2-chlorobenzothioazolyl or chloroacetylamino groups or $\alpha,\beta$-dibromopropionylamino groups.

Further suitable fibre-reactive groups are for example: halocyclobutane, mono- or bis-($\gamma$-halo-$\beta$-hydroxypropyl)amino groups, $\beta$-haloethylsulfamide groups, $\beta$-haloethoxy groups, $\beta$-haloethylmercapto groups, $\gamma$-halo-$\beta$-hydroxypropylsulfamide groups or 2,3-epoxypropyl groups.

In the case of the water-soluble basic dyes, they are the customary salts and metal halide double salts, for example zinc chloride double salts, of known cationic dyes, particularly of methine and azamethine dyes, which contain for example: an indolinium, pyrazolium, imidazolium, triazolium, tetrazolium, oxadiazolium, thiodiazolium, oxazolium, thiazolium, pyridinium, pyrimidinium or pyrazinium ring.

The heterocycles mentioned can be unsubstituted or substituted and/or condensed with aromatic rings. Also suitable are cationic dyes of the diphenylmethane, triphenylmethane, oxazine, thiazine and 1,2-pyrane series, as well as finally also dye salts of the arylazo and anthraquinone series.

The dyes can be optionally also in admixture with each other or optionally with dyes of another type.

The dyes usable according to the invention are known, and can be produced by methods known per se.

A preferred class of fibre-reactive dyes usable according to the invention are the dyes of the formula I $$D-Z_n \qquad (I)$$

wherein D is the radical of a metal-free or metal-containing azo, anthraquinone or phthalocyanine dye, which contains one or more water-solubilising groups, Z is a diazinyl or triazinyl group, each containing at least one halogen atom which can be split off and each being bonded by way of an amino group to D, and n is 1 or 2.

Particularly preferred dyes of this class are dyes of the formula Ia $$D-Z'_n \qquad (Ia)$$

wherein D has the meaning given under the formula I, Z' is a group of the formula $$-N\underset{C_{n-1}H_{2n-1}}{\overset{}{|}}-C\overset{N}{\underset{N}{\diagdown}}\underset{Y}{\overset{}{\diagup}}C-(W)_{\overline{p-1}}R$$

wherein
W is $$-N-\underset{C_{(q-1)}H_{(2q-1)}}{\overset{|}{}}$$

X is halogen, preferably Cl or F,
Y is =N—, =CH— or =CX—,
n is 1 or 2, preferably 1,
p is 1 or 2,
q is 1 to 3, and
R in the case where p is 2 can be unsubstituted or substituted lower alkyl, phenyl or naphthyl, and where p is 1 it can be halogen, lower alkoxy or alkoxyalkoxy, unsubstituted or substituted phenoxy or —NH$_2$.

A further preferred class of fibre-reactive dyes are the dyes of the formula II $$D'-Z''_n \qquad (II)$$

wherein D' is the radical of a metal-free or metal-containing azo, nitro, pyrazolone, thioxanthone, oxazine anthraquinone, stilbene or phthalocyanine dye, which contains one or more water-solubilising groups, Z" is an acyl group of a carboxylic acid containing at least one halogen atom which can be split off, and n is 1 or 2.

Preferred dyes of this class are dyes of the formula IIa $$D'\!-\!\!\left[\!\!\begin{array}{c}N-CO-Q\\ |\\ C_{(q-1)}H_{(2q-1)}\end{array}\!\!\right]_n \qquad (IIa)$$

wherein
D' and n have the meanings defined under the formula II,
Q is $$-\underset{R_3}{\overset{}{\underset{|}{C}}}=\underset{R_2}{\overset{}{\underset{|}{C}}}-R_1, \quad -\underset{R_2}{\overset{}{\underset{|}{CH}}}-R_1 \text{ or } -\underset{R_3}{\overset{}{\underset{|}{CH}}}-\underset{R_2}{\overset{}{\underset{|}{CH}}}-R_1,$$

one or two of the substituents $R_1$, $R_2$ and $R_3$ being halogen, preferably Br or Cl, and the others being hydrogen, and q is a number from 1 to 3.

The compositions obtainable according to the invention contain 20 to 95 percent by weight, preferably 65 to 95 percent by weight, of at least one water-soluble dye and optionally 1 to 30 percent by weight of a surface-active substance, and/or 1 to 45 percent by weight of further additives as well as residual moisture, the compositions preferably containing a total of 3 to 50 percent by weight of the surface-active substance and further additives.

Semipermeable membranes usable according to the invention should keep back macromolecular substances whilst ensuring a high flow-through of water and dissolved substances having a low molecular weight, for example salts, such as sodium chloride, potassium chloride, ammonium sulfate, sodium phosphate, potassium sulfate and sodium acetate, or low-molecular impurities, for example unreacted or partially decomposed starting products.

The membranes according to the invention should also be capable of separating differently charged molecules.

The retention or the separation (cut-off level) is determined by the molecular weight and the ionic charge. Membranes advantageously used have a "cut-off level" of at least 90% retention. This so-called membrane hyperfiltration is also known as reverse osmosis and is related to ultrafiltration. By the term 'reverse osmosis' are meant separation processes in the molecular range.

Suitable membranes usable according to the invention are advantageously semipermeable, charged, preferably asymmetrical, membranes of which the pores have a diameter of 1 to 500 Å. They consist preferably of organic material containing ionic groups. These membranes have a cut-off level of 300 to 500 molecular weight. Membranes having a cut-off level of 400 to 500 molecular weight are particularly suitable for the process according to the present invention. They allow water, optionally mixed with organic solvents, and dissolved substances, which by virtue of their molecular weights fall below the separation level (cut-off level), to pass through at high velocities per unit surface area and at low to medium pressure. The pressures used according to the invention are 10 to 100 bars, and preferably 10 to 30 bars. The pressure can be applied for example by means of a pump.

The salting-out effect in a filtration operation can be up to 70 percent and more without losses of dye. The volume of the solution of retained substances (on the concentrate side) decreases correspondingly, and the concentration of the retained portion increases. If a further reduction of the low-molecular component is desired, this can be effected without difficulty, after dilution of the retained solution or suspension with water advantageously up to the initial volume, by repeating the procedure either once or several times. The separation process can also be performed continuously by adjustment of the rate of supply of water to the rate of reduction of the volume of permeate. It is possible in this simple manner to obtain at room temperature, both discontinuously and continuously, salting-out and purification effects of up to 95%, or if required even up to 99% and more, that is to say, until the permeate is free from undesirable substances.

The preferred membranes usable according to the invention consist essentially of a polymeric substance which is modified at least on the surface by radicals having ionisable groups. Modified, natural, semisynthetic or synthetic materials can in this way be processed into membranes. A polymeric substance to be modified in such a manner contains as reactive groups for example hydroxyl and/or amino groups. It can then be reacted with suitable reagents containing on the one hand an ionisable group and on the other hand a reactive group capable of forming a covalent bond. The following polymeric compounds can for example be modified in the given manner:

polymeric electrolytes, cellulose ethers or esters, such as cellulose nitrate or cellulose propionate, preferably cellulose acetates, for example those having a low content of acetyl groups, but also higher acylated celluloses, for example so-called 2½-acetate, or polyacrylonitrile and copolymers formed from acrylonitrile and other ethylenically unsaturated monomers.

Suitable reagents which contain an ionisable group and the radical forming a bridge member between this group and the starting polymer are colourless and coloured compounds, for example ionic reactive dyes, which can belong to various classes of dyes, such as anthraquinone, azo or formazan dyes. The following may be mentioned as reactive groups which render possible the bonding of these reagents to the starting polymer:

carboxylic acid halide groups, sulfonic acid halide groups, radicals of $\alpha,\beta$-unsaturated carboxylic acids, for example of acrylic acid, methacrylic acid, $\alpha$-chloroacrylic acid or $\alpha$-bromoacrylic acid, radicals preferably of lower haloalkylcarboxylic acids, for example of chloroacetic acid, $\alpha,\beta$-dichloropropionic acid or $\alpha,\beta$-dibromopropionic acid, radicals of fluorocyclobutanecarboxylic acids, for example of tri- or tetrafluorocyclobutane carboxylic acid, radicals having vinylacyl groups, for example vinylsulfone groups or carboxyvinyl groups, and halogenated pyrimidine or 1,3,5-triazine groups.

The membrane-forming polymeric substances can contain as ionisable groups for example: sulfato groups, sulfonic acid groups, sulfonic acid amide groups, carboxylic acid groups, carboxylic acid amide groups, hydroxyl, thiol, isocyanate and/or thioisocyanate groups, ammonium groups formed from primary, secondary or tertiary amino groups and hydrogen, or quaternary ammonium groups, also phosphonium or sulfonium groups. Particularly favourable results are obtained in some cases with substances containing sulfonic acid groups. The membranes which are especially valuable and extensively adaptable are those of which the polymeric materials consists of a polymer modified by an azo dye containing sulfonic acid groups. The azo dye can also contain metal bound in complex linkage, for example copper.

Preferred membranes are semipermeable membranes formed from cellulose acetate or from polyacrylonitrile and copolymers from acrylonitrile and other ethylenically unsaturated monomers. These membranes consist for example of a cellulose acetate basic structure, which has been modified by reaction of only partially acetylated cellulose acetate with a polyfunctional polymer which contains ionic groups and is bound by way of a bridge member to the cellulose acetate basic structure.

It is also possible however to use membranes consisting of a basic structure which contains polyacrylonitrile or a copolymer from acrylonitrile and other ethylenically unsaturated monomers, and which has been modified by reaction with hydroxylamine and subsequently with a polyfunctional compound which contains ionic groups and is optionally bonded by way of a bridge member to the basic structure.

The proportion of acrylonitrile units in the basic structure of the membrane is advantageously at least 5 and preferably at least 20 percent by weight.

Preferred copolymers are those of acrylonitrile and vinyl acetate, vinyl ethers, vinyl pyridine, vinyl chloride, styrene, butadiene, (meth)-acrylic acid, maleic anhydride, 2-aminomethylmethacrylate or allyl compounds, or ter- or tetrapolymers based on acrylonitrile.

The bridge member of the membrane is advantageously derived from an organic compound containing at least 2 functional groups.

The polyfunctional polymer of the membrane contains in particular aliphatic or aromatic amino groups, hydroxyl, thiol, isocyanate and/or thioisocyanate groups. The polyfunctional polymer is preferably derived from polyethyleneimine, polyvinyl alcohol, cellulose derivatives or polyvinyl aniline.

The membrane contains as ionic group preferably a sulfonic acid group, a carboxylic acid group or an ammonium group.

Particularly advantageous membranes are those containing radicals of a reactive dye as radicals having ionic groups.

These membranes can be produced for example by reacting with the substance of a membrane, which contains groups capable of forming covalent bonds, a compound containing at least one ionic group and at least one reactive group capable of forming covalent bonds with the groups capable of forming covalent bonds contained in the membrane substance, and then subjecting the membrane modified in this manner to a heat treatment ("tempering"). The pore size of the membrane skin is largely determined by the heat treatment. The membrane is treated for example for 1 to 30 minutes at a temperature of 60° to 90° C., advantageously by immersing it in warm water. The heat treatment can optionally be carried out before the reaction with the reactive compound containing ionisable groups, or alternatively the reaction may be performed before the polymeric material is processed into the form of the asymmetrical membrane.

The membranes can have various forms, for example lamellar, foliated, tubular, or they can be in the shape of a pouch, of a cone or of hollow fibres. In the case of a heavy pressure load, the membranes can naturally be supported by wire mesh or by perforated plates. Within the range given above, the pore size can be varied by different tempering treatments and likewise adapted to suit the specific purpose of application. The mean charge density (equal to content of ionisable groups) of the membrane is advantageously 1 to 100 milliequivalents per kg of dry membrane.

The process according to the invention is for example performed in the following manner.

The starting solution or suspension used for the preparation of the dye formulation for producing the dye compositions according to the invention is advantageously an aqueous suspension of the moist press or filter cake of the crude dyes containing varying amounts of undesirable dissolved substances having a low molecular weight, particularly by-products occurring during synthesis of the dye and dissolved inorganic salts. In cases where for example the coupling and/or condensation product can be salted out only with extreme difficulty or not at all, it is also possible to use the crude coupling, condensation or neutralisation solution directly. The content of the dye in the starting solution or suspension is advantageously 2 to 50%.

With some dyes, especially metal-complex dyes, it is advantageous when the crude dye obtained from the synthesis solution or as press cake is wet ground by known methods, for example in a sand mill or Mikrosol mill.

To the synthesis mixture can be added further additives and/or surface-active substances desired for producing the dye compositions. The additives, and in particular the surface-active substances, are in this manner likewise desalted and concentrated in one operation. To effect separation of synthesis by-products having molecular weights below the "cut off level" of the employed membrane, the mixture is passed through a semipermeable membrane. The mixture is simultaneously concentrated to have a content of dye of 10% and advantageously 20 to 50%. The resulting concentrated and desalted solutions of water-soluble dyes, optionally after the addition of further additives and subsequent stirring to obtain a homogeneous suspension, are then dried.

The widest variety of dryers or granulating apparatus suitable for drying or granulating a solid substance formed from a liquid preparation thereof can be used, for example a spray dryer, disc dryer, grinder dryer, for example of the "Mikrontrockner" type, or a fluidised bed apparatus. Drying can be performed either batchwise or continuously.

The compositions according to the invention are advantageously produced continuously in a fluidised bed apparatus, such as that known for example from the German Offenlegungsschrift No. 2,231,445, in which process the defined concentrated and desalted preparation in the form of a solution or suspension, or as a mixture of a solution and suspension, containing the dye together with the additives mentioned, is sprayed into a fluidised bed apparatus, continuously or batchwise, and granular material is removed continuously or batchwise from the fluidised bed whilst this is being maintained. The material thus removed is then preferably sifted, the coarse fractions with a diameter greater than 5 mm, optionally after particle-size reduction, and the fine fractions having a diameter of less than 0.1 mm being fed back, continuously or batchwise, into the aqueous preparation and/or into the fluidised bed. The particles having a size of between 0.1 and 5 mm constitute the preferred fraction of the compositions according to the invention, and particles of this size are particularly suitable for use in dye compositions. The desalted and concentrated synthesis solution or suspension can be mixed and homogenised with the additives, and the mixture can be subsequently sprayed into the fluidised bed. Further pulverulent additives can be sprayed into the fluidised bed simultaneously with the aqueous dye preparation.

In a preferred embodiment, the aqueous suspension or solution obtained from reverse osmosis and containing at least one dye, water and the additives and/or surface-active substances as defined is finely sprayed onto a fluidised bed consisting of the final product (granulate). The process can however also be performed by the said suspension or solution or the dry powder form being continuously fed in, whilst water containing the additives and/or surface-active substances is being sprayed in. The formed granulate is continuously taken from the fluidised bed with subsequent separation of coarse and fine fractions, the fine fraction and the coarse fraction, optionally after particle-size reduction, being then returned to the suspension or preferably to the fluidised bed.

The fluidised bed is produced by a stream of gas, which preferably has an inlet temperature of 35° to 300° C., the temperature in the fluidised bed advantageously being 50° to 100° C.

The fluidised-bed pressure difference ($\Delta p$) is preferably 50 to 150 mm water column (WC), and the flow rate is 0.5 to 3 meters per second.

The temperature difference ($\Delta T$) in the fluidised bed is usually within the range of 5° to 15° C. The throughput can be adjusted to suit the type of apparatus and product. It is advantageous to use an apparatus having a sieve plate surface area of 2.5 m$^2$, which can be operated to give an output of 100 to 900 liters of liquid preparation per hour.

The process according to the invention renders possible the production of compositions having a high dye content. There are obtained by the process of the invention low-dust to dust-free granulates which have a particle size of between 50 and 2000 $\mu$m, particularly between 100 to 2000 $\mu$m, and which are characterised by a uniform, dimensionally stable particle size and relatively high bulk density, by high mechanical strength, by their free-flowing characteristics and by their good dissolving properties, such as wetting and dispersibility. In particular these granulates form no dust during transport and processing, a property which they retain even during storage over several months, for example 6 to 12 months, at a temperature of $-10°$ C. to $+50°$ C. There are obtained by use of these compositions for preparing aqueous dye baths low-foam to foam-free liquors having very good solution stability, even in the presence of electrolytes.

In the following Examples which further illustrate the invention, 'parts' are parts by weight, and percentages percent by weight, whilst temperatures are in degrees Centigrade, and WC denotes water column. The acid dyes are as a rule in the form of alkali salts, in particular the sodium salt. The designation 'low-dust' with respect to the compositions indicates that there are virtually no particles below 50 μm in size present.

The various tests were carried out as follows:

DUST TEST

A metal funnel having an internal diameter of 10 cm with a tube (internal diameter 15 mm) is placed onto a metal cylinder of 500 cm$^3$ capacity, the lower end of the tube extending down to the 200 cm$^3$ level of the cylinder. A pierced circular filter paper (Schleicher and Schüll LS14) is secured at the 400 cm$^3$ level of the cylinder, the filter paper being moistened with water to the extent that it is moderately moist but not dripping wet. 10 g of the substance to be treated are then poured quickly through the funnel; the funnel is taken out after 3 minutes, and the circular filter paper is removed by cutting. This filter paper is then assessed on the basis of the scale of ratings from 1 to 5 as follows:

rating 1=severe release of dust, when the circular filter paper is heavily shaded to deeply coloured;
rating 2=considerable release of dust, when the circular filter paper is slightly shaded;
rating 3=moderate release of dust, when the circular filter paper exhibits many specks of colour, some of which are in contact with each other;
rating 4=slight release of dust, when the circular filter paper exhibits spots of colour, none of which are connected with each other;
rating 5=negligible release of dust, when the circular filter paper exhibits a scarcely visible staining or at most scattered spots of colour.

ABRASION TEST

Testing of the mechanical strength of dye granulates. 40 g of the dye granulate to be tested are rotated at 25 r.p.m. for 200 minutes (=5000 revolutions) in a Plexiglas drum (diameter 30 cm) fitted with a fall baffle plate (ERWEKA GmbH, Germany). The abrasion of the dye is determined by the dust test. The evaluation is made by comparing the results of the dust test before the mechanical treatment with dust-test results obtained after the treatment.

BULK DENSITY

About 50–100 g of granulate are weighed accurately to one gram (G) into a 250 ml measuring cylinder. The charge is made more compact by lightly bumping the measuring cylinder twenty times on a rubber base, and the volume attained is read off in ml (V). The bulk density is calculated as follows:

G(in gram)/V(in ml).

The bulk density can be tested also by means of a tamped volume measuring appliance (volumeter) from ENGELSMANN, Ludwigshafen, according to DIN sheet No. 53,194.

SUSPENSION TEST

Testing of the behaviour of water-soluble dyes on being stirred to a paste (suspended) with cold water.

10 g of the dye granulate to be tested are weighed in a 100 ml beaker. 10 ml of desalted (or distilled) water at 20° are added, and the whole is stirred to a paste by means of a glass rod (diameter 5 mm) for a maximum of 30 seconds. The formed paste is judged visually with respect to appearance, wettability, lumpiness (soft, hard, rubbery or sticky) and formation of foam:

ideal behaviour: readily wettable, homogeneous, soft or thinly liquid paste;
unsatisfactory: hard, rubbery and/or sticky lumps.

For the purpose of further assessment, the formed paste is subsequently slowly diluted with 50 ml of water and the behaviour judged:

good behaviour: good dispersion and rapid breakdown of formed lumps;
unsatisfactory: poor dispersion and poor breakdown of formed lumps.

WETTABILITY

Determination of the wettability of dyes soluble in cold water.

3 g of the dye composition to be tested are evenly scattered, with stirring, in 100 ml of desalted water at 20° contained in a 200 beaker. Immediately afterwards the mixture is stirred for 10 seconds at 750 r.p.m. with a magnetic stirrer (magnetic bar: diameter 7 mm, length 35–40 mm). When unwetted dye is still floating on the surface, stirring is repeated again for 10 seconds. This operation is repeated until the dye is completely wetted.

Assessment:
up to 10 seconds—very good
11–20 seconds—good
21–30 seconds—moderately good (adequate)
>30 seconds—inadequate.

COLD-WATER SOLUBILITY

Sprinkling method

A specific amount (in g) of the dye composition to be tested is added to 200 ml of desalted water at 20° in a 400 ml beaker with stirring (magnetic stirrer at 750 r.p.m.), stirring being continued for 2 minutes. The dye solution or fine dispersion is then filtered under vacuum through a Meraklon filter (7 cm diameter), and subsequently dewatered under vacuum. The solubility limit is exceeded when filter residues appear.

Suspension method

The amount of dye composition to be tested is stirred to a paste or wetted with the 1- to 3-fold amount of water in a 400 ml beaker. The dye mixture is subsequently diluted to 200 ml with desalted water at 20°, and stirred for 1 minute with a magnetic stirrer (at 750 r.p.m.). The dye solution or fine dispersion is then filtered under vacuum through a Meraklon filter (7 cm diameter), and afterwards dewatered under vacuum. The solubility limit has been exceeded when filter residues appear.

The cold-water solubility is taken as being the lower of the two values for the maximum soluble amount of dye in g/l determined from the two methods.

HOT-WATER SOLUBILITY AT 60°

The amount of dye composition to be tested is taken into solution in 200 ml of desalted water by boiling the liquid in a 300 ml Erlenmeyer flask. The solution is afterwards allowed to cool to 65° by standing in air, and is subsequently filtered through a moistened filter paper (SS 1450 CV, 7 cm diameter). Rinsing is finally carried out with 50 ml of desalted water at 60° (under vacuum).

The hot-water solubility is taken as being the highest concentration of the dye granulate in water to leave no filter residue.

ELECTROLYTE SOLUBILITY AT 20°

By electrolyte solubility is meant the solution stability in the dye bath in the presence of electrolytes of the dyeing process.

The amount of dye composition to be tested has 150 ml of desalted water at about 60° poured over it in a 300 ml Erlenmeyer flask; the dye composition is dissolved by 10 minutes' stirring at 60° (with a magnetic stirrer) on a water bath, and the solution is susequently cooled to 20°. 50 ml of a solution containing per liter 240 g of sodium chloride and 20 g of calcined sodium carbonate per liter are added to the cooled test solution, and the whole is allowed to stand for 30 minutes at 20° (thermostat). The test solution is filtered through a moistened filter paper (SS 1450 CV, 7 cm diameter), and subsequently rinsed with 50 ml of hot desalted water (under vacuum).

The highest concentration of the dye composition in water to leave no filter residue is taken as a measure of electrolyte solubility.

PRODUCTION OF THE MEMBRANES

The preferred membranes usable according to the invention can be produced for example as follows:

A solution is produced from 25 g of cellulose acetate (EASTMAN KODAK, Type 398/10, acetylation degree=39.8%), 45 g of acetone and 30 g of formamide. The solution is left to stand for three days; it is then poured onto a glass plate and evenly spread with a spatula to form a layer 0.6 mm thick; the solvent is allowed to evaporate off for 5 seconds at 25°; the glass plate is placed for 2 hours in ice water, and the formed membrane is removed from the glass plate. The membrane is then immersed in a 5% aqueous solution of the 1:2-chrome complex of the dye of the formula

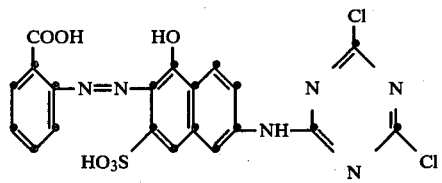

and remains there for 48 hours at pH 6 and at 25°. The pH value of the dye solution is thereupon adjusted to 10.4 by the addition of sodium hydroxide, and the solution is continuously agitated at 25° for 40 minutes.

Instead of treating the membrane in this way in two stages with the dye solution, it is also possible to treat it in one stage for 2½ hours at a pH-value of 10.5 and at 25° with a 10% solution of the chrome-complex dye. The subsequent heat treatment (tempering) consists of placing the membrane in water at 60° for 10 minutes.

EXAMPLE 1

The filter press cake of the dye of the formula

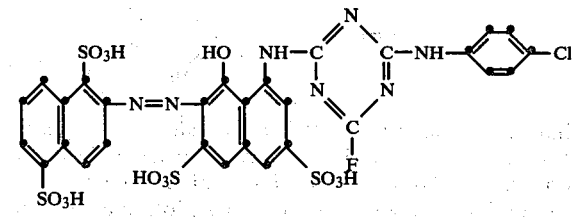

is introduced into an aqueous solution to give a dry content of 10%, and in an apparatus for reverse osmosis having a membrane surface area of 0.4 m² (cellulose-acetate membrane [40% acetylation degree], modified with an acid halotriazine-containing reactive dye according to German Offenlegungsschrift No. 2,505,254), the 10% aqueous dye solution is desalted and further concentrated for 10 hours with application of an excess pressure of 10–30 bars. The resulting viscous suspension of 22% dry content is stirred up with a 4% disodium hydrogen phosphate solution, calculated relative to the dry content of the suspension, and there is then added a 20% solution, calculated relative to the dry content of the suspension, of a dispersing agent (sodium salt of a naphthalenesulfonic acid/formaldehyde concentration product). The suspension obtained in this manner is subsequently dried by means of a fluidised-bed granulator to obtain a dye granulate having a high density and good abrasion resistance. Any dust fraction remaining in the granulated material is removed with the aid of an air-jet filter.

A dye granulate of the following composition is obtained:

74.7% of crude dye, virtually salt-free,
15.5% of dispersing agent,
3.0% of disodium hydrogen phosphate, and
6.7% of residual moisture.

| Properties of the finished granulate | | Comparative granulate (without reverse osmosis) |
|---|---|---|
| abrasion resistance | 5 | 4 |
| dust rating | 4 | 3 |
| solubility at 60° C. | 120 g/l | 80 g/l |
| electrolyte solubility: | 20 g/l | 12.5 g/l |
| cold water solubility | 80 g/l | 50 g/l |
| suspension | good | moderate |
| wetting | good | moderate |
| bulk density | 0.6 kg/l | 0.45 kg/l |
| particle size distribution: | | |
| <90 μm | 6% | 15% |
| 90–350 μm | 79% | 80% |
| >350 μm | 15% | 5% |

(b) When a nozzle spray dryer, grinder dryer, disc dryer or some other drying apparatus is used in the above example in place of the fluidised bed granulator, the dye granulates obtained have similar properties.

EXAMPLE 2

(a) 1000 ml of the synthesis solution (obtained directly from the synthesis of the dye) of the dye of the formula

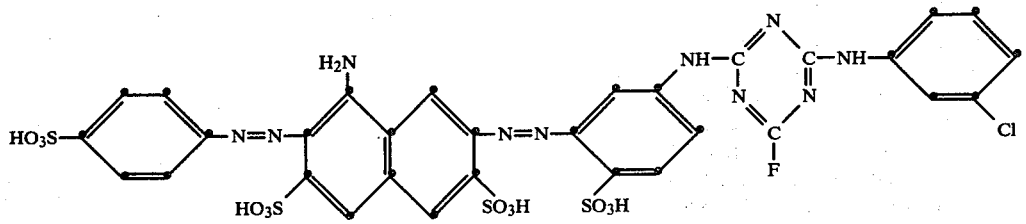

having a dry content of 10% are desalted in an apparatus for reverse osmosis as described in Example 1, and concentrated to a volume of 450 ml. To the resulting suspension is added a solution of 5 g of disodium hydrogen phosphate in 30 ml of water at 50° C. There are additionally added 40 ml of a 50% solution of a dispersing agent based on a naphthalenesulfonic acid/formaldehyde condensation product. This suspension is fed into a spray dryer and granulated.

An abrasion-resistant granulate having a smooth surface and high bulk density of the following composition is obtained:
73% of crude dye, virtually free from salt,
4.8% of disodium hydrogen phosphate,
17.2% of dispersing agent (condensation product), and
5% of water as residual moisture.

| Properties of the finished granulate | | Comparative granulate (without reverse osmosis) |
|---|---|---|
| abrasion resistance | 4 | 3 |
| dust rating | 5 | 4 |
| solubility 60° C. | 100 g/l | 80 g/l |
| electrolyte solubility | 40 g/l | 25 g/l |
| cold water solubility | 40 g/l | 25 g/l |
| suspension | good | moderate |
| wetting | good | moderate |
| bulk density | 0.6 kg/l | 0.4 kg/l |
| particle size distribution: | | |
| <90 μm | 15% | 20% |
| 90–350 μm | 75% | 75% |
| >350 μm | 10% | 5% |

(b) When there is used in the above Example, instead of a spray dryer, some other granulator, such as a disc dryer, fluidised bed granulator or grinding dryer, dye granulates having similar properties are obtained.

EXAMPLE 3

(a) 1000 ml of the synthesis solution (obtained directly from the dye synthesis) of the dye of the formula

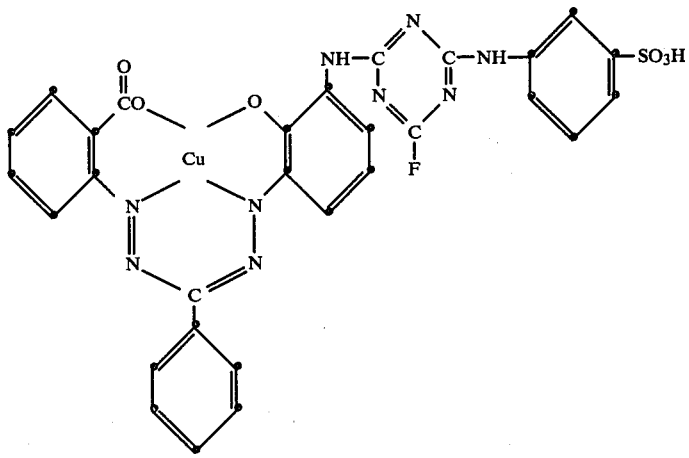

having a dry content of 10% are desalted in an apparatus for reverse osmosis as described in Example 1, and concentrated to a volume of 450 ml. To the resulting suspension is added a solution of 4 g of disodium hydrogen phosphate in 30 ml of water at 50° C. There are additionally added 32 ml of a 50% solution of a dispersing agent based on a naphthalenesulfonic acid/formaldehyde condensation product. This suspension is fed into a spray dryer and granulated.

An abrasion-resistant granulate having a smooth surface and high bulk density is obtained, the composition of this granulate being as follows:
75% of crude dye virtually free from salt,
4% of disodium hydrogen phosphate,
15% of dispersing agent (condensation product), and
6% of water as residual moisture.

| Properties of the finished granulate | | Comparative granulate (without reverse osmosis) |
|---|---|---|
| abrasion resistance | 4 | 3 |
| dust rating | 5 | 3 |
| solubility 60° C. | 100 g/l | 80 g/l |
| electrolyte solubility | 40 g/l | 20 g/l |
| cold water solubility | 50 g/l | 30 g/l |
| bulk density | 0.65 kg/l | 0.35 kg/l |
| particle size distribution: | | |
| <90 μm | 12% | 23% |
| 90–350 μm | 70% | 65% |
| 350 μm | 18% | 12% |
| chemical stability of the dry commercial form on storage for 3 months at 40° C.: | stable | loss of colouring strength 15%, |

EXAMPLE 4

(a) 1000 ml of the synthesis solution (obtained directly from the dye synthesis) of the dye of the formula

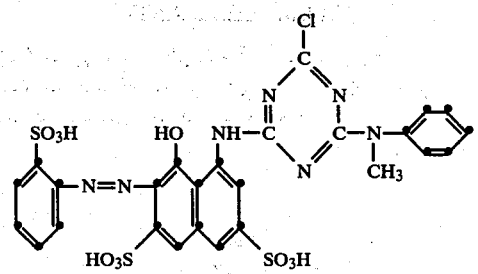

having a dry content of 10% are desalted in the apparatus for reverse osmosis as described in Example 1, and concentrated to a volume of 450 ml. To the resulting suspension is added a solution of 5 g of disodium hydrogen phosphate and 4 g of sodium tripolyphosphate in 30 ml of water at 50°. Additionally are added 28 ml of a 50% solution of a dispersing agent based on a naphthalene sulfonic acid/formaldehyde condensation product. This suspension is fed to a spray dryer and granulated.

An abrasion-resistant granulate having a smooth surface and a high bulk density is obtained, the composition of the granulate being as follows:

77% of crude dye virtually free from salt,
3.8% of disodium hydrogen phosphate,
10.8% of a dispersing agent (condensation product),
3.0% of sodium tripolyphosphate, and
5.4% of water as residual moisture.

| Properties of the finished granulate | | Comparative granulate (without reverse osmosis) |
|---|---|---|
| abrasion resistance | 4 | 2 |
| dust rating | 5 | 3 |
| solubility 60° C. | 100 g/l | 70 g/l |
| electrolyte solubility | 30 g/l | 20 g/l |
| cold water solubility | 80 g/l | 60 g/l |
| bulk density | 0.55 kg/l | 0.45 kg/l |
| particle size distribution: | | |
| <90 μm | 12% | 20% |
| 90–350 μm | 80% | 78% |
| >350 μm | 8% | 2% |
| storage stability, chemical stability of the reactive dye at 40° C. during three months of storage: | stable | loss of colouring strength 25%, unstable |

EXAMPLE 5

(a) 250 g of the filter press cake of the dye of the formula

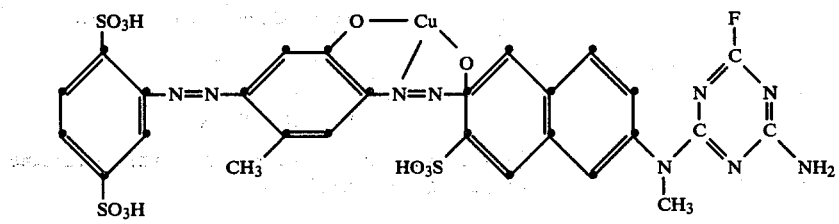

having a dry content of 40% are stirred in 1000 ml of water to a homogeneous suspension, and there are immediately added 15 g of a 40% aqueous solution of a reaction product of oleic acid with 20 mols of ethylene oxide at 50°. Also added are 20 ml of a 50% solution of a naphthalenesulfonic acid/formaldehyde condensation product. This solution is subsequently fed into an apparatus for reverse osmosis and whilst in circulation is desalted and dewatered under 10–30 bars of excess pressure for 10 hours until the concentration of solids is 25%.

The concentrated and desalted suspension thus obtained can be used, optionally after dilution with water and/or organic solvent to give the desired colouring strength, and if necessary with the addition of water-soluble dyeing auxiliaries, directly as a liquid dye formulation.

The concentrated suspension obtained by reverse osmosis is transferred to a fluidised bed granulator and granulated. The result is a smooth, abrasion-resistant and low-dust granulate of high bulk density, the composition of the granulate being as follows:

80% of crude dye virtually free from salt,
6% of a reaction product of oleic acid and 20 mols of ethylene oxide,
9% of a naphthalenesulfonic acid/formaldehyde condensation product, and
5% of water as residual moisture.

| Properties of the finished granulate | | Comparative granulate (without reverse osmosis) |
|---|---|---|
| dust rating | 4 | 2 |
| abrasion resistance | 4 | 1 |
| solubility 60° C. | 100 g/l | 80 g/l |
| bulk density | 0.7 kg/l | 0.35 kg/l |
| particle size distribution: | | |
| <90 μm | 6% | 12% |
| 90–350 μm | 72% | 79% |
| >350 μm | 12% | 9% |

(b) Dye granulates having similar properties are obtained by using in the above Example, in place of a fluidised bed granulator, some other granulator, such as a nozzle spray dryer, disc dryer or grinder dryer.

EXAMPLES 6 AND 7

When the dye given in Example 5 is replaced by one of the following dyes, the procedure otherwise being as in Example 5, there are obtained dye granulates having similar properties:

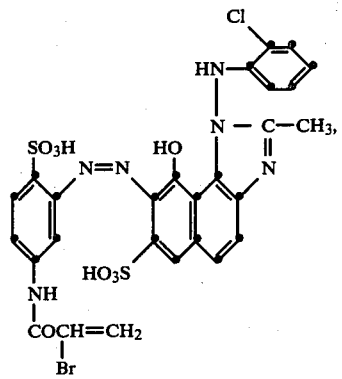

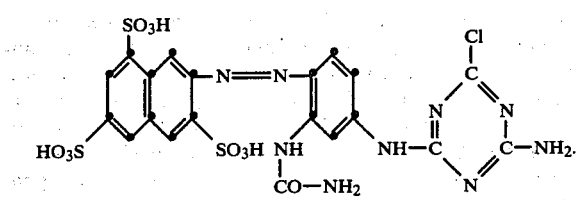

Dye granulates having similar properties are obtained by using, instead of the dispersing agents given in the above Examples, corresponding amounts of the auxiliaries listed in the following table, the procedure otherwise being the same.

EXAMPLE NO.

8. Hydroxylignin sulfonate.
9. Condensation product of stearyl alcohol and 35 mols of ethylene oxide.
10. Reaction product of commercial hydroabietyl alcohol (a mixture of about 45% of tetrahydroabietyl alcohol, 40% of dihydroabiethyl alcohol and 15% of dehydroabietyl alcohol) etherified with 100 mols of ethylene oxide.
11. Reaction product of oleyl alcohol with 80 mols of ethylene oxide.
12. Polyvinylpyrrolidone.
13. Sodium salt of the condensation product of naphthalenesulfonic acid with formaldehyde of the formula

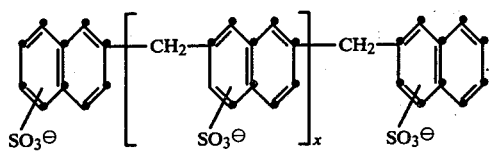

x = 0 to 7

14. Polymerisation product of acrylic acid or methacrylic acid of the formula

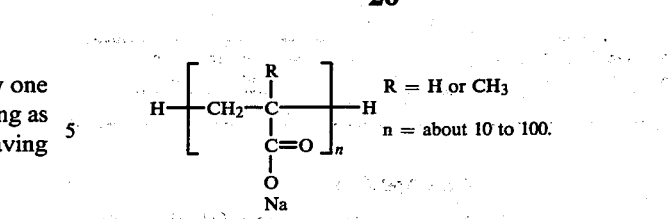

15. Acetylenic nonionic tenside of the formula

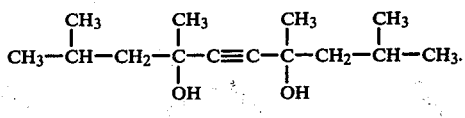

EXAMPLE 16

The filter cake of the dye mixture of the 1:2 chrome-complexes of the formulae

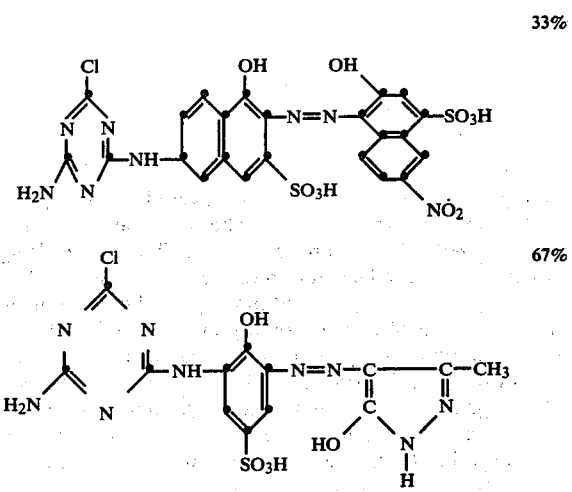

is taken into an aqueous preparation to give a dry content of about 10%, and the preparation is further concentrated and desalted in an apparatus for reverse osmosis as described in Example 1. To the resulting viscous suspension of about 15.8% dry content are added, with vigorous stirring, about 25.3% of sodium sulfate, 16.5% of lignin sulfate, 11.4% of a condensation product of oleic acid having 20 mols of ethylene oxide, and 5.1% of a mixture of paraffin oil and a nonionic emulsifier, calculated relative to the dry crude dye. The pH-value of the suspension is adjusted with a 10% sodium hydroxide solution to 6.0 to 7.5, and subsequently the suspension is homogenised by thorough stirring. It is then sprayed into a fluidised bed of product powder of the same composition as the dry constituent of the suspension under the following conditions:

Composition of the preparation 15.8% of crude dye,
4.0% of sodium sulfate,
2.6% of lignin sulfonate,
1.8% of a condensation product of oleic acid and 20 mols of ethylene oxide,
0.8% of paraffin oil + nonionic emulsifier, and
75% of water;
air-inlet temperature: 150° C.±5°,
air-outlet temperature: 65° C., fluidised-bed temperature difference (ΔT): 10° C.±2° C., fluidised-bed pressure difference (Δp): 90 mm WC±5 mm, flow rate: 0.5–3 m/sec.;

amount of pulverulent dye preparation to form the fluidised bed: about 100 kg/m²; and amount of aqueous dye preparation sprayed into the fluidised bed: about 650 liters/hour (throughput).

Any fine fraction present or fine powder formed in the course of the process is separated in the sifter located at the outlet side and is fed back for subsequent agglomeration.

The product obtained is a low-dust, flowable and dimensionally stable dye granulate having a high bulk density as well as good wettability and solubility, even in cold water, the composition of the granulate being as follows:

60% of crude dye virtually free from salt,
15% of sodium sulfate,
10% of lignin sulfonate, 7% of a condensation product of oleic acid and 20 mols of ethylene oxide, 3% of paraffin oil + nonionic emulsifier, and 5% of residual moisture.

This granulate exhibits clearly better solubility in cold water and better wettability than are exhibited by the product having the same additives but produced without reverse osmosis.

EXAMPLES 17 TO 28

By using, in place of the dyes given in the preceding Examples, the metal-complex dyes listed in the Tables A to C which follow, the procedure otherwise remaining the same, there are obtained granulates having a similar composition and similar properties.

In Table A are listed 1:2-mixed complexes which contain 1 molecule of a dye of column III and 1 molecule of a dye of column IV, bound in complex linkage with 1 metal atom of column II.

TABLE A

| I Ex. No. | II Metal | III Dye | IV Dye | V Shade |
|---|---|---|---|---|
| 17 | Cr | [structure] | [structure] | navy blue |
| 18 | Fe | [structure] | [structure] | brown |
| 19 | Cr | [structure] | [structure] | brown |
| 20 | Cr | [structure] | [structure] | green |

In Table B are listed 1:1-complexes which contain 1 molecule of the dye bound in complex linkage with 1 metal atom

TABLE B
| I Ex. No. | II Metal | III Dye | IV Shade |
|---|---|---|---|
| 21 | Fe | 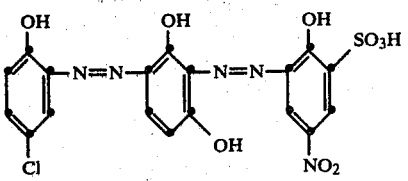 | brown |
| 22 | Cr | 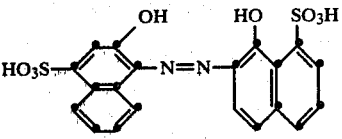 | blue |
| 23 | Cr | 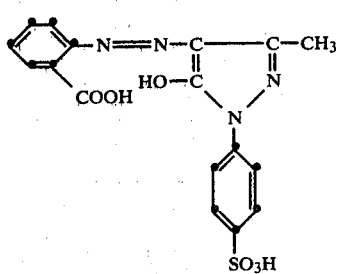 | yellow |
Further 1:1-metal complexes are listed in the following Table C.
TABLE C
| I Ex. No. | II Dye | III Shade |
|---|---|---|
| 24 | 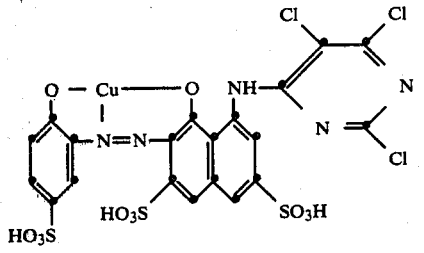 | violet |
| 25 | 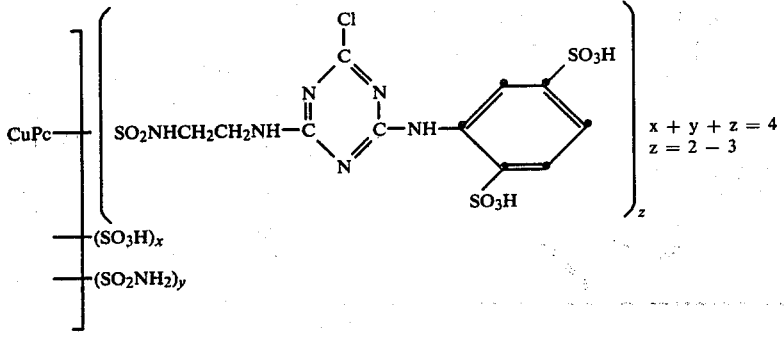 | turquoise blue |
| 26 | CuPc—(SO$_3$H)$_2$ | turquoise blue |

TABLE C-continued

| I<br>Ex. No. | II<br>Dye | III<br>Shade |
|---|---|---|
| 27 | NiPc with [-SO₃H, -SO₂NH₂, -SO₂HN-]₃ linked to phenyl-NH-C(=N)-N=C(Cl)-N=C(NH₂) triazine | turquoise blue |
| 28 | HO-naphthyl(N)-N=N-phenyl-SO₃H, 1:2-Co—complex | brown |

EXAMPLE 29

360 g of moist dye press cake containing 120 g of the dye of the formula

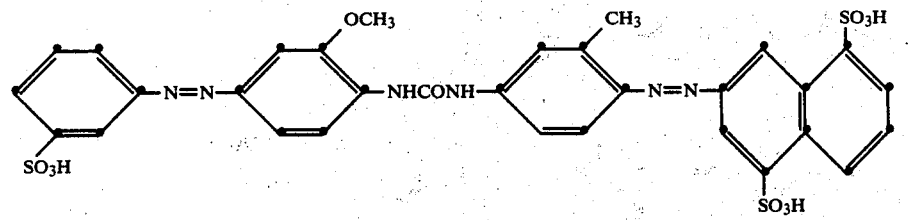

are suspended in 1500 ml of water, and the dye suspension containing about 15% of sodium chloride is further concentrated and desalted at room temperature as described in Example 1. After removal without loss of dye of about 94% of the theoretically determinable amount of sodium chloride (measured on the basis of the salt content of the permeate) from the original suspension, the dye solution thus obtained is further processed to obtain granulates in the manner described in the preceding Examples.

By replacing in the above Example the dye of the press cake by corresponding amounts of the substantive dyes listed in column II of the following Table D, the procedure otherwise being as given in Example 29, there are likewise obtained dye granulates having similar properties, which dye cellulose fibres in the shades shown in the last column.

TABLE D

| I<br>Ex. No. | II<br>Dye | III<br>Shade |
|---|---|---|
| 30 | O₂N-phenyl(SO₃H)-CH=CH-phenyl(SO₃H)-N=N(→O)-phenyl-N=N-phenyl-SO₃H | orange |
| 31 | phenyl-N=N-naphthyl(OH)(HO₃S)(NHCONH-)-naphthyl(SO₃H)-N=N-phenyl-NHCOCH₃ | scarlet |
| 32 | phenyl-N=N-pyrazolone(C-OH)(CH₃)-N=N-phenyl(HO₃S)-phenyl(SO₃H)-N=N-pyrazolone(HO-C)(CH₃)-N=N-phenyl | yellow |

TABLE D-continued

| I Ex. No. | II Dye | III Shade |
|---|---|---|
| 33 | 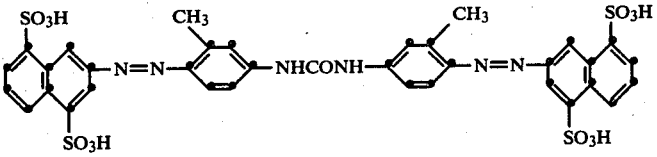 | yellow |
| 34 | self-condensation product of 5-nitro-o-toluenesulfonic acid (C.I. 40000) | yellow |
| 35 | 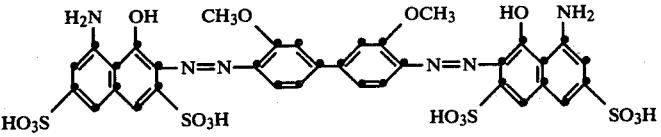 | blue |
| 36 | 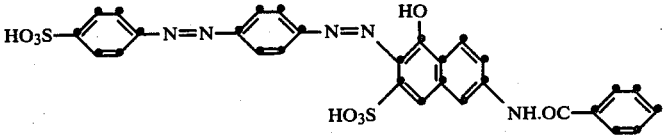 | red |
| 37 | 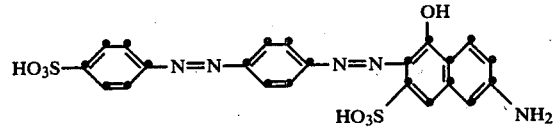 | red |
| 38 | 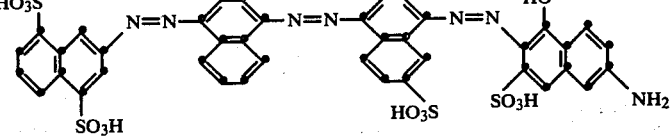 | blue |
| 39 | 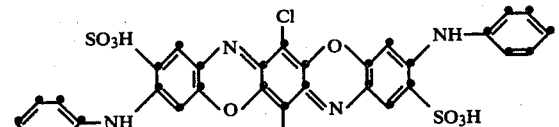 | blue |
| 40 | 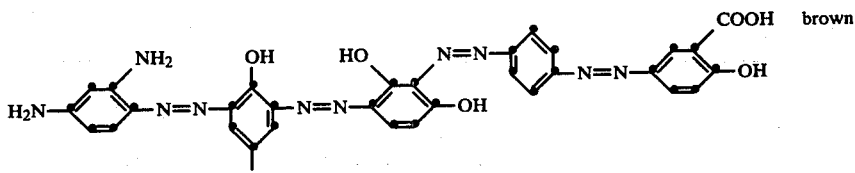 | brown |

EXAMPLES 41 TO 49

When the procedure is carried out in the manner described in the preceding Examples under analogous operating conditions, except that the dyes used are those listed in the following Tables E and F, granulates having similar properties are obtained.

In Table E are listed acid dyes which dye synthetic polyamide fibre material or wool in the shades shown in the last column.

TABLE E
| Ex. No. | Dye | Shade |
|---|---|---|
| 41 | 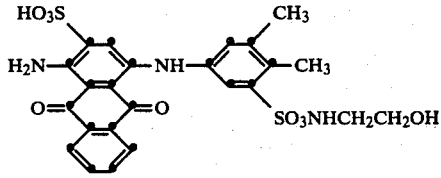 | blue |
| 42 | 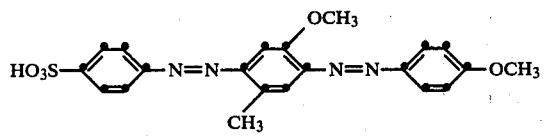 | orange |
| 43 | 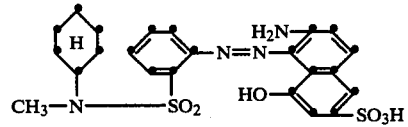 | red |
| 44 | 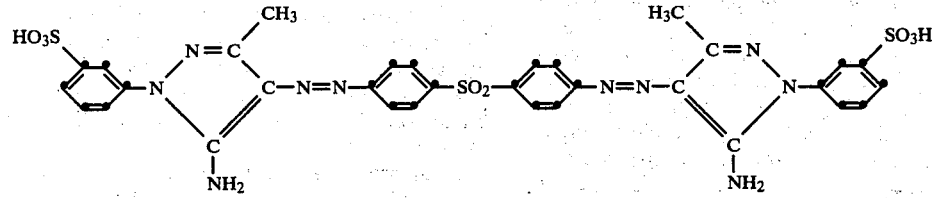 | yellow |
In Table F are given basic dyes which dye fibre material made from polyacrylonitrile in the shades listed in the last column.
TABLE F
| Ex. No. | Dye | Shade |
|---|---|---|
| 45 | 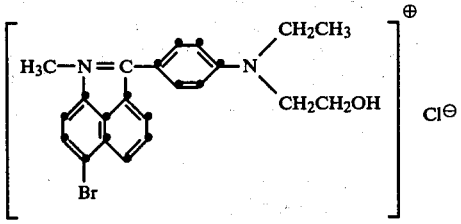 | blue |
| 46 | 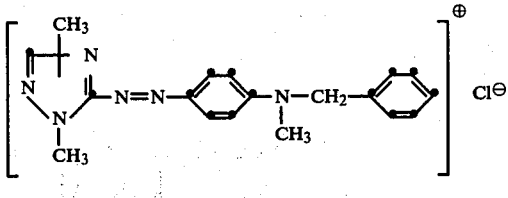 | red |
| 47 | 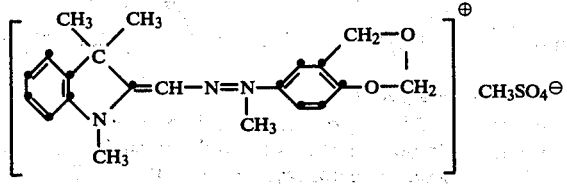 | yellow |

TABLE F-continued

| I Ex. No. | II Dye | III Shade |
|---|---|---|
| 48 | [structure with CH3O, S, N-CH3, C=N-N-, N-CH2CH2OH, C2H5]⊕ ½(SO4)⊖ | blue |
| 49 | [structure: H2N-, NH2, CH3, -N=N-, CH3, -N=N-, H2N, CH3, -NH2] HCl | brown |

What is claimed is:

1. A process for producing a solid dye composition, which process comprises passing an aqueous solution or suspension of at least one water-soluble crude dye, to effect separation of synthesis by-products having molecular weights of below 500 and partial separation of water, through a semipermeable asymmetric membrane, containing ionic groups and the pores of which membrane having a diameter of 1 to 500 Å; subsequently drying the resulting aqueous preparation which has become more highly concentrate, wherein drying is performed in a granulating apparatus, a spray dryer or a fluidised bed apparatus; and adding a surface active agent before or after passage of the aqueous solution or suspension through the semipermeable membrane, the surface active agent being added beforehand only when it does not become separated by the membrane.

2. A process according to claim 1, wherein the membrane consists of a cellulose acetate basic structure which has been modified by reaction of only partially acetylated cellulose acetate with a polyfunctional polymer which contains ionic groups and is bound by way of a bridge member to the cellulose acetate basic structure.

3. A process according to claim 1, wherein the membrane consists of a basic structure which contains polyacrylonitrile or a copolymer from acrylonitrile and other ethylenically unsaturated monomers, and which has been modified by reaction with hydroxylamine and subsequently with a polyfunctional compound which contains ionic groups and is optionally bonded by way of a bridge member to the basic structure.

4. A process according to claim 2 or 3, wherein the bridge member of the membrane is derived from an organic compound containing at least 2 functional groups.

5. A process according to claim 4, wherein the polyfunctional polymer of the membrane contains aliphatic or aromatic amino groups, hydroxyl, thiol, isocyanate or thioisocyanate groups.

6. A process according to claim 5, wherein the polyfunctional polymer is derived from polyethyleneimine, polyvinyl alcohol, cellulose derivatives or polyvinylaniline.

7. A process according to claim 2 or 3, wherein the ionic groups contained by the membrane are sulfonic acid groups, carboxylic acid groups or ammonium groups.

8. A process according to claim 2 or 3, wherein the membrane contains radicals of a water-soluble reactive dye as radicals having ionic groups.

9. A process according to claim 2, wherein the membrane contains radicals of a water-soluble reactive dye as radicals having ionic groups.

10. A process according to claim 3, wherein the proportion of acrylonitrile units in the basic structure of the membrane is at least 5%.

11. A process according to claim 10, wherein the basic structure of the membrane contains copolymers of acrylonitrile and vinyl acetate, vinyl ethers, vinyl pyridine, vinyl chloride, styrene, butadiene, (meth)-acrylic acid, maleic anhydride, 2-aminomethylmethacrylate or allyl compounds, or ter- or tetrapolymers based on acrylonitrile.

12. A process according to claim 1, wherein the surface-active agent is an anionic or nonionic tenside.

13. A process according to claim 12, wherein the anionic tenside is a condensation product based on phenol-, cresol-, or naphthol- or naphthalenesulfonic acid and formaldehyde, or a ligninsulfonate (sulfite-cellulose waste liquor) or a hydroxyligninsulfonate.

14. A process according to claim 13, wherein the anionic tenside is a condensation product based on naphthalenesulfonic acid and formaldehyde.

15. A process according to claim 12, wherein the anionic tenside is the sodium salt of the condensation product of naphthalenesulfonic acid with formaldehyde of the formula

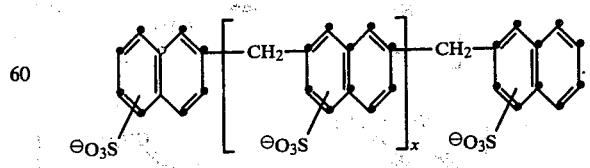

$x = 0$ to 7.

16. A process according to claim 12, wherein the anionic tenside is the polymerisation product of acrylic acid or methacrylic acid of the formula

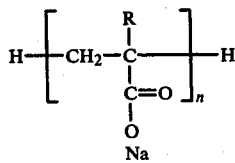

wherein R is H or CH₃ and n is about 10 to 100.

17. A process according to claim 12, wherein the nonionic tenside is a condensation product of a fatty acid, which contains 8 to 22 carbon atoms, and 10 to 30 mols of ethylene oxide, preferably of oleic acid and 20 mols of ethylene oxide.

18. A process according to claim 12, wherein the nonionic tenside is a fatty alcohol polyglycol ether from a hydrocarbon radical, which contains 8 to 22 carbon atoms, and 20 to 100 mols of ethylene oxide.

19. A process according to claim 18, wherein the nonionic tenside is a fatty alcohol polyglycol ether from oleyl alcohol and 80 mols of ethylene oxide, or from stearyl alcohol and 35 mols of ethylene oxide.

20. A process according to claim 12, wherein the nonionic tenside is hydroabietyl alcohol etherified with 25 to 100 mols, preferably 100 mols, of ethylene oxide.

21. A process according to claim 12, wherein the nonionic tenside is a compound of the formula

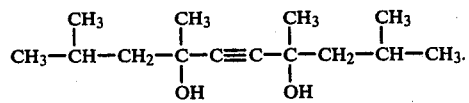

22. A process according to claim 1, comprising the further step of adding at least one additive selected from the group consisting of binding agents, anti-dust agents, solubility-promoting agent, and diluting agents.

23. A process according to claim 22, wherein the binding agent is polyvinylpyrrolidone.

24. A process according to claim 22, wherein the binding agent is dextrin.

25. A process according to claim 22, wherein the anti-dust agent is a mixture of mineral oil or mineral oil sulfonic acid and an emulsifier, or of paraffin oil and a nonionic emulsifier.

26. A process according to claim 22, wherein the solubility-promoting agent is urea.

27. A process according to claim 22, wherein the diluting agent is sodium chloride, sodium sulfate, sodium hydrogen sulfate, sodium carbonate, sodium hydrogen carbonate, mono-, di- or trisodium phosphate, sodium tripolyphosphate, polyphosphates, lithium chloride or sodium acetate.

28. A process according to claim 1, wherein 1 to 30 percent by weight of the surface-active agent, relative to the granulate, is used.

29. A process according to claim 1, wherein the surface-active agent and the further additives are used in total amounts of 3 to 50 percent by weight, relative to the granulate.

30. A process according to claim 1, wherein the water-soluble dye is an anionic dye.

31. A process according to claim 30, wherein the dye is a metal-complex dye.

32. A process according to claim 30, wherein the dye is a fibre-reactive dye.

33. A process according to claim 32, wherein the dye is of the formula $$D-Z_n$$

wherein
D is the radical of a metal-free or metal-containing azo, anthraquinone or phthalocyanine dye, each containing one or more water-solubilising groups,
Z is a diazinyl or triazinyl group each containing at least one halogen atom which can be split off and each being bonded by way of an amino group to D, and
n is 1 or 2.

34. A process according to claim 32, wherein the dye is of the formula $$D'-Z''_n$$

wherein
D' is the radical of a metal-free or metal-containing azo, nitro, pyrazolone, thioxanthone, oxazine, anthraquinone, stilbene or phthalocyanine dye, each of which contains one or more water-solubilising groups, Z'' is an acyl group of a carboxylic acid containing at least one halogen atom which can be split off, and
n is 1 or 2.

35. A process according to claim 1, wherein the water-soluble dye is a basic dye.

36. The compositions of water-soluble dyes obtained by the process according to claim 1.

37. A composition according to claim 36, which composition contains 20 to 95 percent by weight of at least one water-soluble dye, 1 to 30 percent by weight of a surface-active agent, and 1 to 45 percent by weight of at least one further additive, as well as residual moisture, the composition containing a total of 3 to 50 percent by weight of the surface-active agent and the further additive.

* * * * *

UNITED STATES PATENT AND TRADEMARK OFFICE
CERTIFICATE OF CORRECTION

PATENT NO. : 4,390,342
DATED : June 28, 1983
INVENTOR(S) : Beat Bruttel, et al

It is certified that error appears in the above-identified patent and that said Letters Patent is hereby corrected as shown below:

| | |
|---|---|
| Col. 1, line 31 | Correct spelling of "drying" |
| Col. 12, line 28 | Delete "with" and substitute --without-- |
| Col. 12, line 30 | After "200" insert --ml-- |
| Col. 14, line 31 | Delete "concentration" and substitute --condensation-- |
| Col. 15, line 1 | Middle of structure insert --OH-- as follows: |

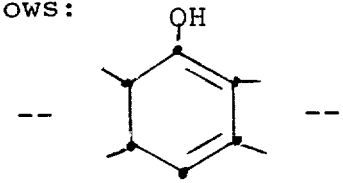

Signed and Sealed this

Twenty-second Day of October 1985

[SEAL]

Attest:

DONALD J. QUIGG

Attesting Officer

Commissioner of Patents and Trademarks—Designate